US006785957B2

(12) United States Patent
Tsao

(10) Patent No.: US 6,785,957 B2
(45) Date of Patent: Sep. 7, 2004

(54) APPARATUS FOR MANUFACTURING MAGNETIC CORE WITH R-ANGLE

(75) Inventor: Wei-Chang Tsao, Taipei (TW)

(73) Assignee: Dinkle Enterprise Co., Ltd. (TW)

( * ) Notice: Subject to any disclaimer, the term of this patent is extended or adjusted under 35 U.S.C. 154(b) by 0 days.

(21) Appl. No.: 10/184,949

(22) Filed: Jul. 1, 2002

(65) Prior Publication Data

US 2004/0000609 A1 Jan. 1, 2004

(51) Int. Cl.[7] .................................................. B23P 19/00

(52) U.S. Cl. .......................... 29/729; 29/605; 29/602.1; 29/735; 29/564.5; 242/434.7

(58) Field of Search .......................... 29/759, 735, 733, 29/748, 564.5, 564.7, 605, 729, 606, 609, 738, 761, 596; 242/602.1, 432.4, 434.7; 264/272.19; 336/225, 96

(56) References Cited

U.S. PATENT DOCUMENTS 3,628,241 A * 12/1971 Toyoda et al. ................ 29/605
4,381,600 A * 5/1983 Mas ........................ 242/434.7
4,741,484 A * 5/1988 Curtis et al. ............. 242/419.3
4,813,126 A * 3/1989 Williamson .................. 29/729
5,016,832 A 5/1991 Curtis, Jr. et al. ......... 242/58.6

FOREIGN PATENT DOCUMENTS

JP 3-86318 * 4/1991 .............. 242/538.2

* cited by examiner

*Primary Examiner*—Minh Trinh
(74) *Attorney, Agent, or Firm*—Baker & McKenzie LLP

(57) ABSTRACT

The invention provides an apparatus for manufacturing a magnetic wound core of a toroidal transformer. The apparatus in accordance with a preferred embodiment of the invention comprises a control device for controlling the apparatus based on parameters of the core material and the wound core, a supplying device for providing the core material ribbon, a grinding device for grinding the lateral edges of the core material ribbon under the control of the control device, and a winding device for receiving and winding the core material ribbon into the wound core. The apparatus according to a further embodiment of the invention further comprises a calibration device for keeping the core material leaving from the supplying device horizontally and centered, a counting device for measuring the length of the core material passing therethrough, a punch device for cutting off the core material ribbon under the control of the control device, a selecting device for directing the core material ribbon for disposal under the control of the control device, and an unloading device for taking the wound core out of the winding device.

15 Claims, 11 Drawing Sheets

APPARATUS FOR MANUFACTURING MAGNETIC CORE WITH R-ANGLE

BACKGROUND OF THE INVENTION

1. Field of the Invention

The invention relates generally to an apparatus and method for manufacturing a magnetic core of a toroidal transformer and, more particularly, to an apparatus and method for manufacturing a wound magnetic core of a toroid transformer with an R-angle.

2. Description of the Related Art

A transformer is an electrical device used to provide a low-voltage power supply from a high-voltage alternating-current (AC) power source, or a high-voltage supply from a low-voltage AC power source. In its most basic form, a transformer consists of a primary coil connected to an AC voltage source for receiving energy therefrom, a secondary coil connected to a load for receiving energy from the primary coil and transmitting to the load, and a core supporting the coils for providing a path for the magnetic lines of flux. The magnetic field (flux) builds up (expands) and collapses (contracts) about the primary coil. The expanding and contracting magnetic field around the primary coil cuts the secondary coil and induces an alternating voltage into the coil. This voltage causes alternating current to flow through the load. The voltage may be stepped up or down depending on the design of the primary and secondary coils.

Transformers are frequently classified on the basis of their uses and purposes, whereas the detailed constructions of the transformers depend on the intended application. Power transformers are generally used to transmit power at a constant frequency. Audio transformers are designed to operate over a wide range of frequencies with a nearly flat response, i.e., a nearly constant ratio of input to output voltage. Radio frequency (RF) transformers are designed to operate efficiently within a narrow range of high frequencies.

Transformers often include silicon steel cores to channel the magnetic field. Such cores keep the magnetic field more concentrated around the coils so that the transformer is more efficient. The cores also keep the magnetic field from being unnecessarily wasted in adjacent pieces of metal. A commonly available transformer core is the toroid core. A toroid transformer is made by placing coils around a core having a closed annular form. The toroid core can be made from magnetic metal alloy by casting, by lamination from magnetic metal alloy sheets, or by winding from a continuous magnetic metal alloy ribbon.

According to a method and apparatus in the art for manufacturing a wound toroidal transformer core, a continuous ribbon of annealed amorphous magnetic core material is removed from a supply spool and wound into an annular cavity defined by a rotating bobbin within a partially assembled toroidal transformer. Efforts are accordingly made to prevent the varnish coating on the coils from being damaged during the subsequent coil winding process. Typically, a lathe machine will be utilized to grind the radial corners of the wound core into an R-angle such that the coils are wound more tightly and uniformly onto the wound cores, as opposed to those without an R-angle.

However, since the inner and outer diameters of the wound toroidal cores are generally different, a set of clamping devices for accommodating different sizes of the wound cores are needed in advance for the lathe machine for securely clamping the wound core. Such disadvantageously makes the manufacturing process unduly burden some significantly increase the cost of the manufacturing equipments. In addition, small particles, which come off the wound core during the lathing process and enter into spaces between layers of the wound core material, become independent conductors that adversely affect the magnetic lines of flux therein. Moreover, iron loss is significantly increased due to damage on the insulating layers of the radial corners of the wound cores.

There is thus a general need in the art for an optimally designed and implemented wound magnetic core for a toroid transformer that advantageously overcomes at least the aforementioned shortcomings in the art.

SUMMARY OF THE INVENTION

In view of the above problems in the art, a primary object of the invention is to provide an apparatus (with a corresponding method) for manufacturing a magnetic core with an R-angle, which advantageously reduces the copper loss, saves the coil material and increases the yield of the toroidal transformers including a wound toroid core thus formed.

The invention accordingly provides an apparatus for manufacturing a magnetic wound core with an R-angle, comprising a control device for controlling the apparatus based on parameters of the core material and the wound core, a supplying device for providing the core material ribbon, a grinding device for grinding the lateral edges of the core material ribbon under the control of the control device, and a winding device for receiving and winding the core material ribbon into the wound core.

In an embodiment of the invention, the apparatus for manufacturing a magnetic wound core with an R-angle further comprises a calibration device for keeping the core material leaving from the supply device horizontally and centered, a counting device for measuring the length of the core material passing therethrough, a punch device for cutting the core material ribbon into a predetermined length, a selecting device for directing the core material of a predetermined length for disposal if the length of the core material ribbon is not the predetermined length and a unloading device for taking the wound core out of the winding device.

In accordance with a further embodiment of the invention, a method is advantageously provided for manufacturing a magnetic wound core having an R-angle from a core material ribbon. The method according to this particular embodiment comprises the steps of cutting the core material ribbon into a predetermined length, forming the core material ribbon having lateral edges into a spread-out shape (such as a generally trapezoidal shape), grinding the lateral edges of the core material ribbon, and winding the core material ribbon into the core wound.

BRIEF DESCRIPTION OF THE DRAWINGS

The invention will become more apparent from the detailed description given herein and below when read in conjunction with the accompanying drawings (not necessarily drawn to scale), which are given by means of illustration only (and thus are not exhaustive) of the various embodiments of the invention, in which.

DETAILED DESCRIPTION OF PREFERRED EMBODIMENTS

In accordance with the invention, an exemplary shape of the core material forming a wound core having an R-angle as it spreads out is an elongated ribbon having a generally trapezoid shape, in which the width of the ribbon at the inner side of the wound core is smaller than the width at the outer side thereof. The invention utilizes such a principle to provide the core material ribbon with an appropriate shape for further winding so as to readily form a wound core with an R-angle, rather than forming a wound core and then further lathing the radial corners of the wound core to form an R-angle.

The apparatus for manufacturing a magnetic wound core with an R-angle in accordance with a preferred embodiment of the invention comprises a control device for controlling the apparatus based on parameters of the core material and the wound core, a supplying device for providing the core material ribbon, a grinding device for grinding the lateral edges of the core material ribbon under the control of the control device, and a winding device for receiving and winding the core material ribbon into the wound core.

Figure 1:
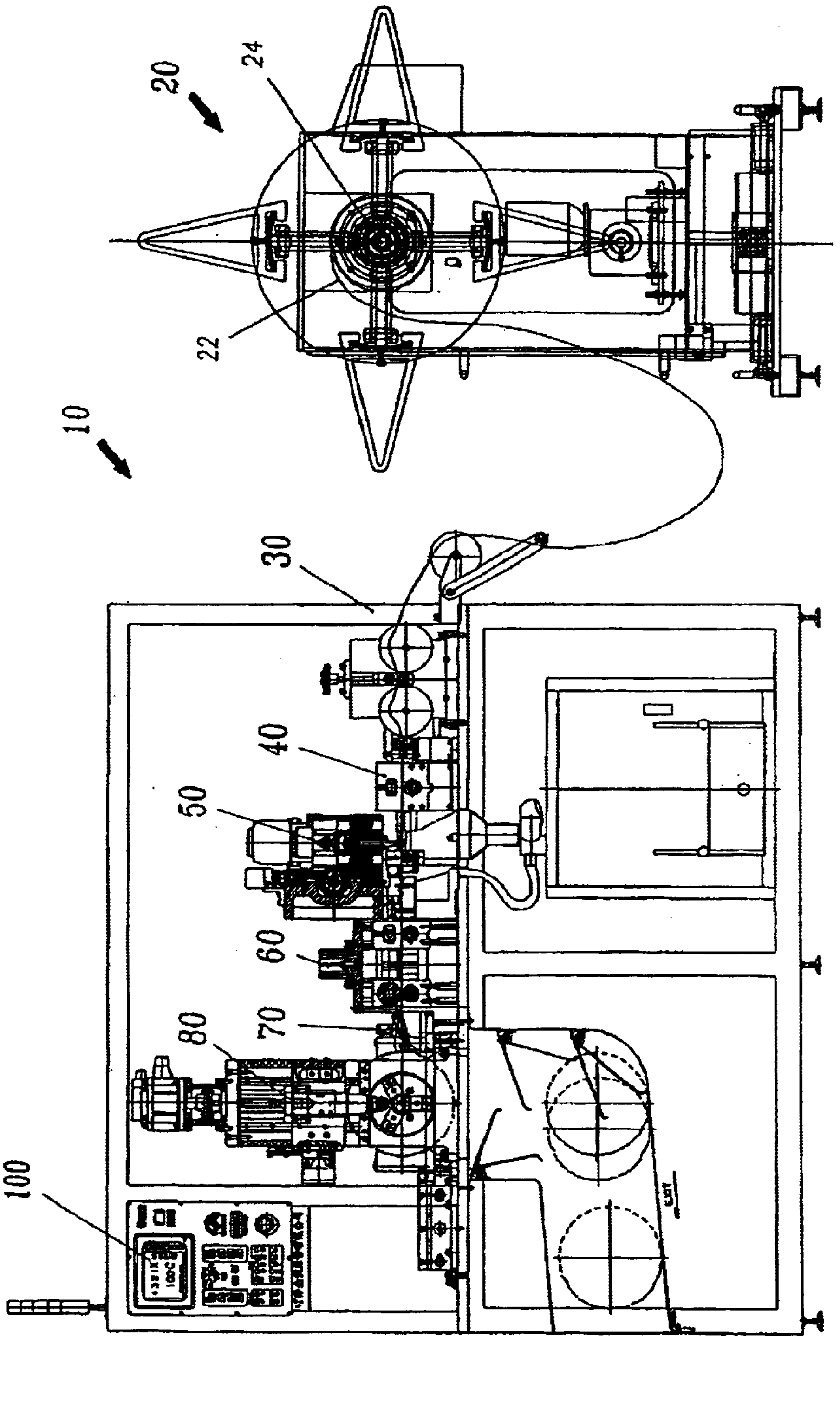
FIG. 1 is a schematic plan view illustrating an exemplary apparatus for manufacturing a magnetic core with an R-angle in accordance with a preferred embodiment of the invention.
Figure 2:
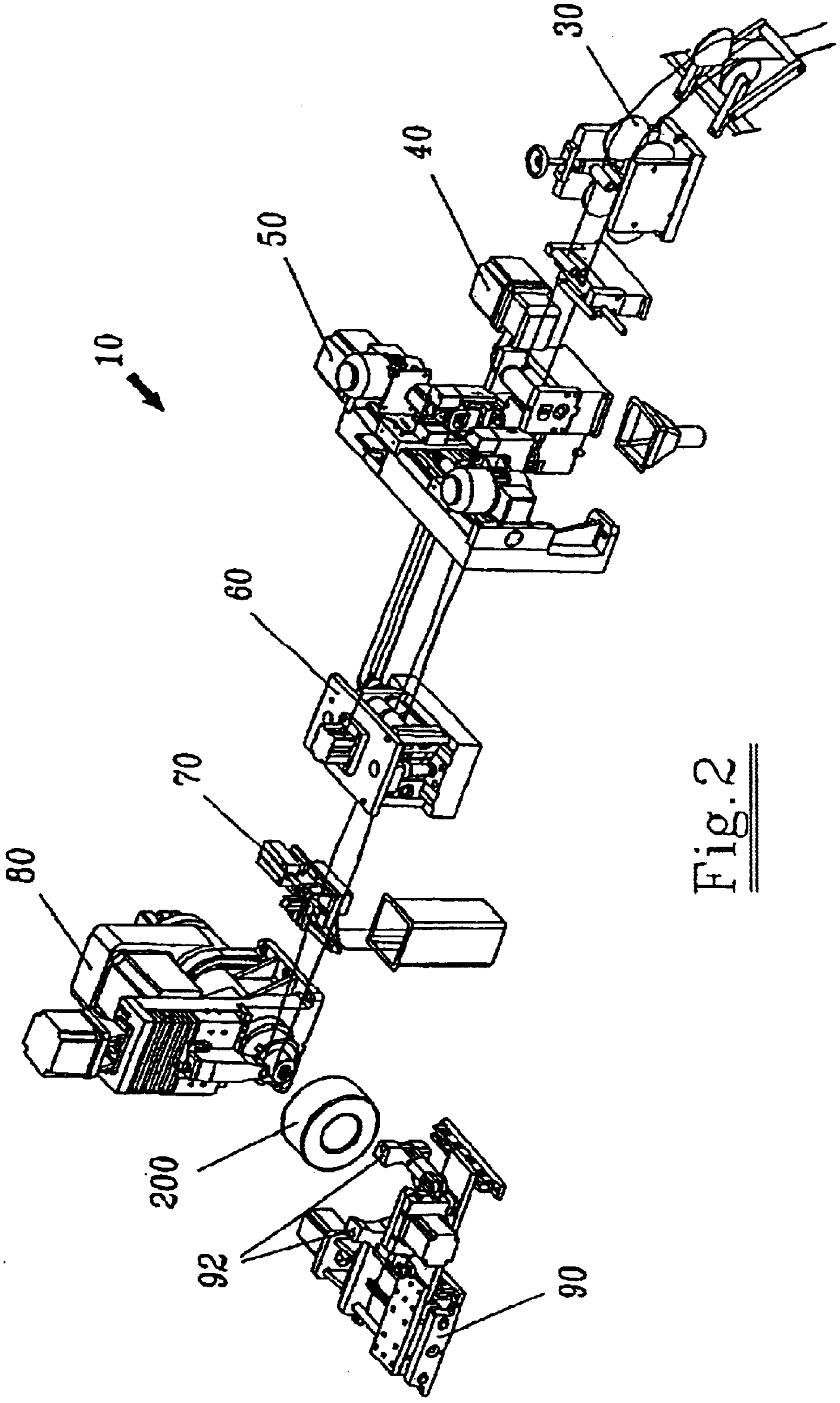
FIG. 2 is an exploded perspective view of the apparatus exemplarily shown in FIG. 1

With reference to FIG. 1 and FIG. 2, an apparatus 10 for manufacturing a wound core 200 of a toroidal transformer in accordance with a preferred embodiment of the invention is shown. The apparatus 10 comprises a supply device 20 having a rotatable supply spool 24, a calibration device 30, a counting device 40, a grinding device 50, a punching device 60, a selecting device 70, a winding device 80, an unloading device 90 and a control device 100. A reel of core material 22, such as silicon steel, is wrapped at the supply spool 24. The core material 22 leaving from the supply spool 24 enters into the calibration device 30, where the core material 22 is kept to be horizontal and centered along its axial center so as to ensure the alignment thereof for the subsequent processes, such as grinding and wrapping. The core material 22 leaving from the calibration device 30 further passes through the counting device 40, where the length of core material passing therethrough is calculated. The length information is transmitted to the control device 100 for determination of the dimensions of the core material based on the input data, such as width of the core material provided from the supply device 20, the inner and outer diameters of the final wound core, and for controlling the operations of all the devices of the apparatus according to the invention. The core material 22 then enters into the grinding device 50. Based on the dimension information calculated and provided by the control device 100, the edges of the core material 22 are ground in the grinding device 50 to gradually reduce the width of the core material 22 so as to form an appropriate shape, such as the spread-out shape of a final wound core with an R-angle, or an elongated trapezoid shape. The punch device 60 receives the length information from the control device 100 and accordingly cuts the core material off once a predetermined length of core material has passed through. The core material ribbon further enters into the winding device 80 and is wound to form a toroidal core with an R-angle. After the wound core is completed, the unloading device 90 takes the wound core from the winding device 80 by utilizing a pair of robot arms 92. Exemplary operations of each device in the apparatus 10 are described herein and below in further detail.

Figure 3:
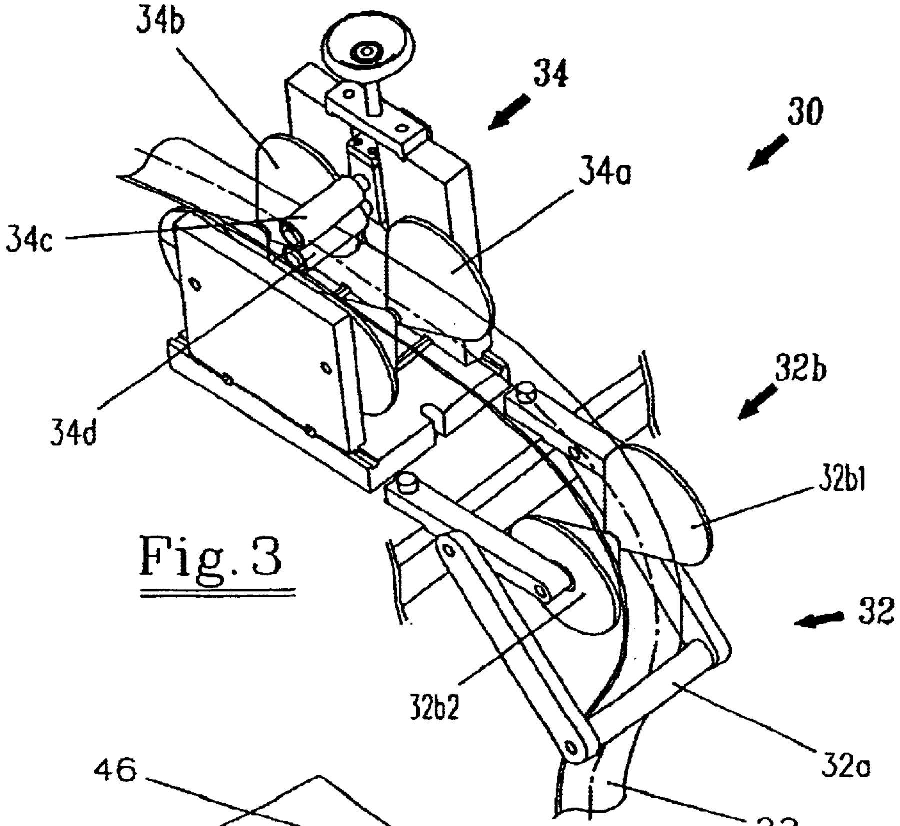
FIG. 3 is a schematic view illustrating an exemplary calibrating device in accordance with an embodiment of the invention.

FIG. 3 is a schematic view that exemplarily illustrates a calibration device 30 in accordance with a preferred embodiment of the invention. The calibration device 30 accordingly comprises a rough alignment device 32 having a cylindrical roller 32*a* and a sandglass-shaped roller 32*b*, composing of two cone-shaped rollers 32*b*1 and 32*b*2, and a horizontally disposed fine alignment device 34 having two sandglass-shaped rollers 34*a* and 34*b*, each of which is composed of two cone-shaped rollers, and a pair of cylindrical rollers 34*c* and 34*d* disposed between the sandglass-shaped rollers 34*a* and 34*b*. The core material ribbon 22 leaving from the supply device 20 first enters into the rough alignment device 32 with one surface of the core material ribbon in contact with the cylindrical roller 32*a* and the other surface of the core material ribbon in contact with and facing toward the sandglass-shaped roller 32*b*. The cylindrical roller 32*a* primarily serves to direct the core material ribbon 22 to the sandglass-shaped roller 32*b*. At the sandglass-shaped roller 32*b*, the lateral edges of the core material ribbon 22 are in contact with the cone-shaped rollers 32*b*1 and 32*b*2, respectively. The cone-shaped rollers 32*b*1 and 32*b*2 are coupled to each other so that they are rotatable in generally the same direction at generally the same rotating speed. In this manner, the contact positions between the lateral edges of the core material ribbon and the corresponding cone-shaped rollers 32*b*1 and 32*b*2 are advantageously self-adjusted so as to maintain the linear speed of each edge of the core material ribbon the same. The cone material ribbon as a whole accordingly moves to the fine alignment device 34 at a generally constant linear speed.

The core material ribbon further enters into the fine alignment device 34. The operation and function of the sandglass-shaped rollers 34*a* and 34*b* are similar to those described herein for sandglass-shaped rollers 32*b*. The cylindrical rollers 34*c* and 34*d*, which are disposed horizontally and parallel to each other, serve to further ensure the core material ribbon passing therethrough being horizontal. Through the rough alignment device 32 and the fine alignment device 34, the core material ribbon leaving the calibration device 30 moves horizontally and at a generally constant speed. Furthermore, the axial center of the core material ribbon is in line with the centerline of the grinding device 50 and the winding device 80. In this manner, the symmetry of the grinding and winding of the core material ribbon is ensured in subsequent processes, which are described in further detail herein and below.

Figure 4:
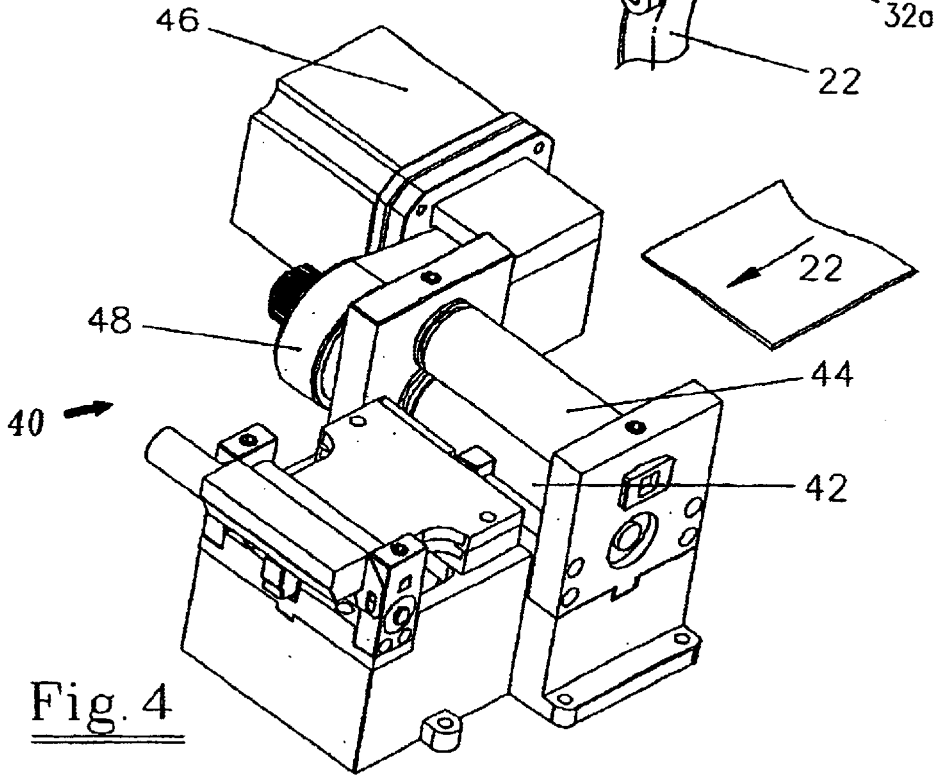
FIG. 4 is a schematic view illustrating an exemplary counting device in accordance with an embodiment of the invention.

FIG. 4 is a schematic view that exemplarily illustrates a counting device 40 for providing necessary information for measuring the length of the core material ribbon 22 passing therethrough in accordance with an embodiment of the invention. The counting device 40 accordingly comprises a pair of cylindrical rollers 42 and 44 horizontally arranged one above the other for the core material ribbon passing therebetween. The lower roller 42 is connected to a servomotor 46 through a belt 48. The servomotor 46 counts the number of revolutions of the lower roller 42 and accordingly provides the revolution data to the control device 100 for further calculation of the length of core material ribbon passing therethrough. The upper roller 44 serves to impart a sufficient downward force on the lower roller 42 by, e.g., biased securing blocks 43, so as to keep the core material ribbon tightly moving between and through the upper and lower rollers 42 and 44. With the thickness of the core material ribbon changes, the biased securing blocks 43 are accordingly adjusted to modify the vertical position of the upper roller 44 (and hence the gap between the upper and lower rollers 42 and 44) such that the downward force applied to the core material is generally kept at an appropriate and sufficient magnitude.

Figure 5:
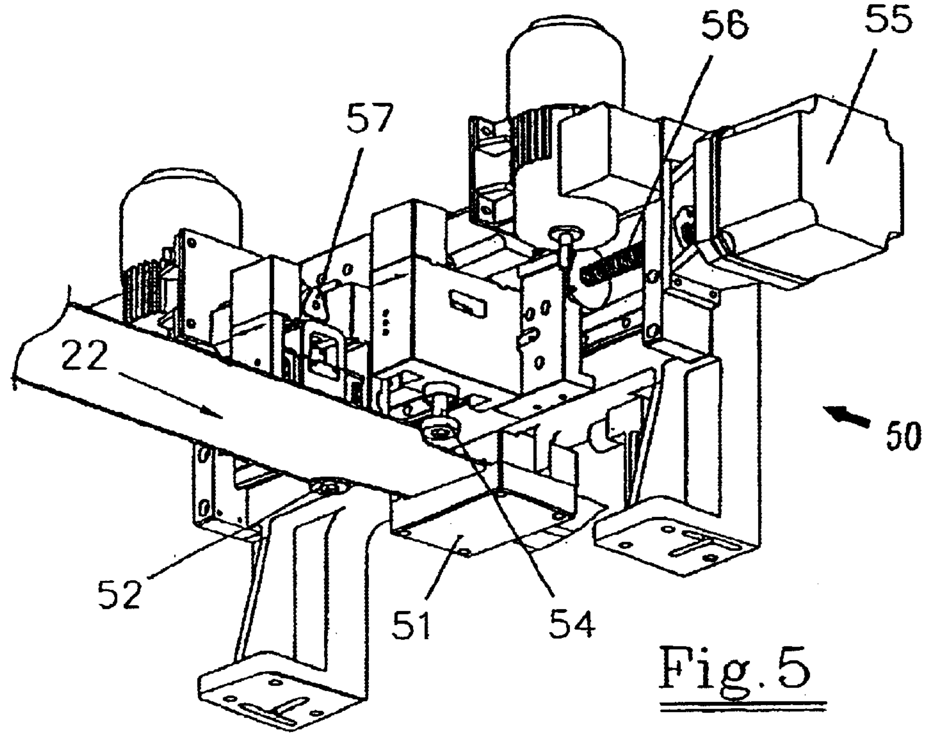
FIG. 5 is a schematic view illustrating an exemplary grinding device in accordance with an embodiment of the invention.

FIG. 5 is a schematic view that exemplarily illustrates the grinding device 50 in accordance with an embodiment of the invention. The grinding device 50 accordingly comprises a device 51 for receiving and supplying the core material ribbon, two grinding wheels 52 and 54 disposed at each side of the core material ribbon for grinding the edges of the core material ribbon, and a servomotor 55 for moving the grinding wheels 52 and 54. The servomotor 55 controlled by the control device 100 (not shown in FIG. 5) actuates two ball screws 56 (only one is shown in the drawing), one having a right-hand thread and the other having a left-hand thread. The grinding wheels 52 and 54 are thus moving horizontally toward or away from each other. Cams 57 are provided for vertically moving the grinding wheels 52 and 54 such that the contact position of each of the grinding wheels 52 and 54 and the corresponding edge of the core material ribbon 22 is reciprocated within the range of the grinding portion of the grinding wheels 52 and 54. In this manner, grinding portions of the grinding wheels 52 and 54 are being worn in a generally uniform fashion so that the life of the grinding wheels is advantageously increased. In addition, the insulating layer coated on the surfaces of the core material ribbon will not be damaged since the edges of the core material ribbon is processed by grinding, as opposed to lathing that will adversely damage the insulating layer of the core material ribbon.

Figure 6A:
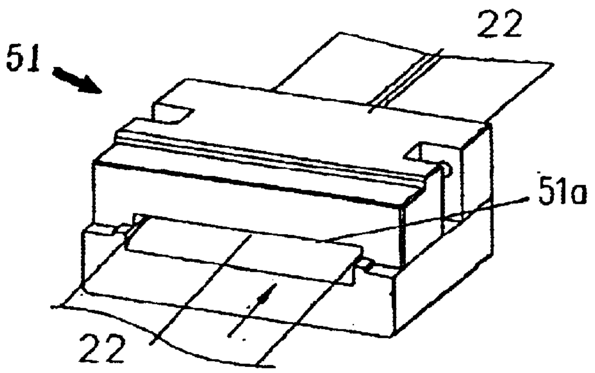
FIG. 6 is a schematic view illustrating an exemplary receiving/feeding device for the grinding device shown in FIG. 5.
Figure 6B:
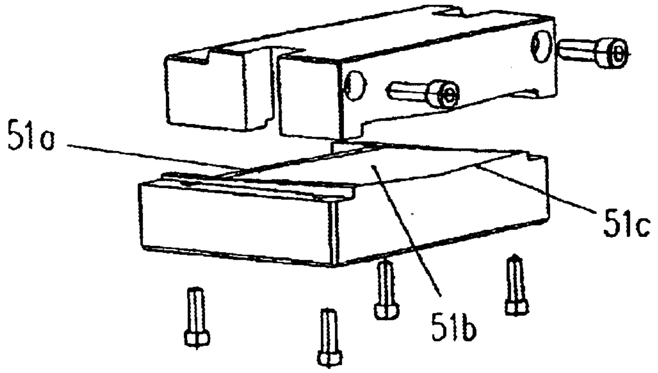

FIG. 6A and FIG. 6B are diagrams that respectively illustrate the perspective and exploded views of the device 51 for receiving and supplying the core material ribbon as shown in FIG. 5. The device 51 accordingly comprises a flat and parallel inlet 51*a* for entrance of the core material ribbon, a curved surface 51*b* transformed from a flat configuration to a slightly V-shaped configuration and a slightly V-shaped outlet 51*c*. The device 51 advantageously serves to enhance the stiffness of the core material ribbon for transmission such that the core material ribbon is prevented from drooping due to its weight.

Figure 7:
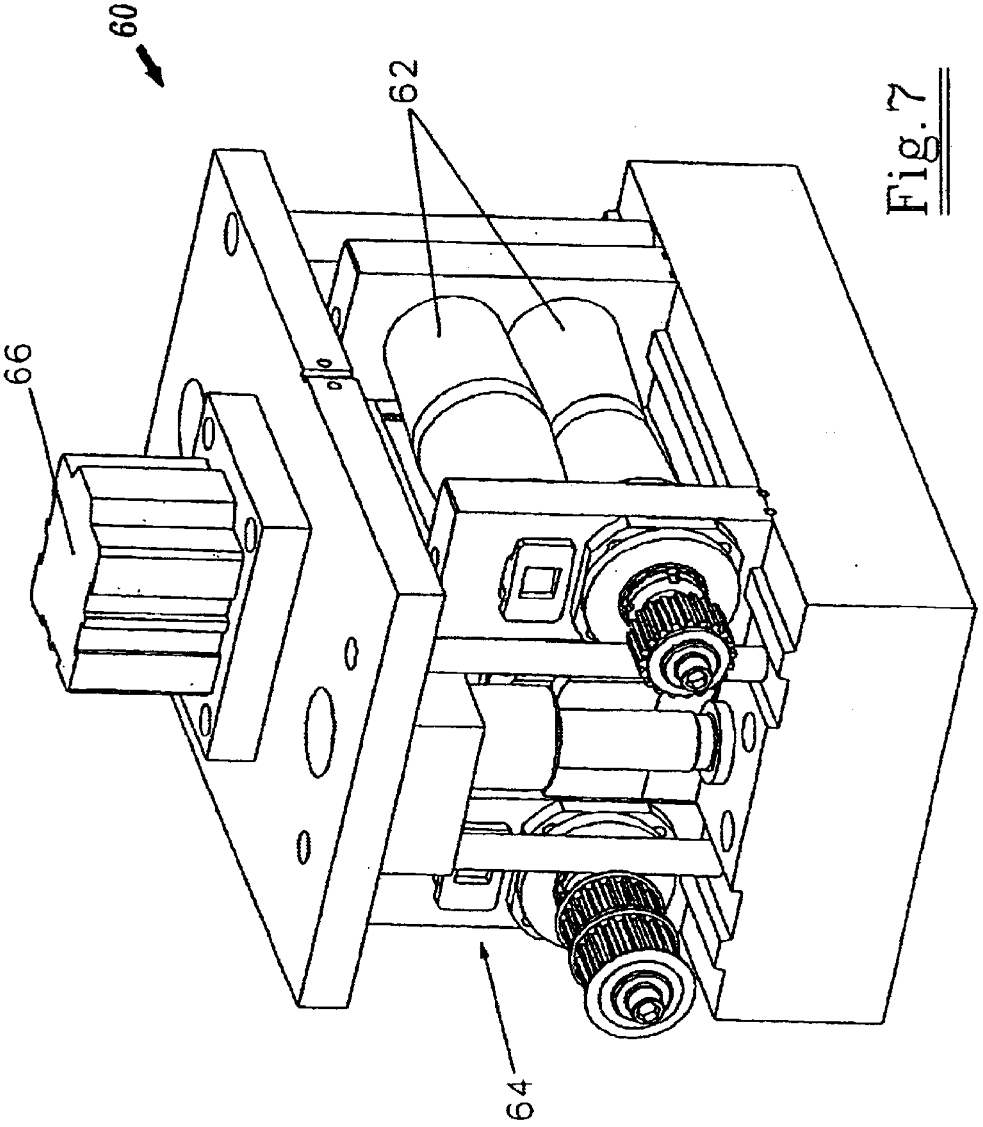
FIG. 7 is a schematic view illustrating an exemplary punching device in accordance with an embodiment of the invention.
Figure 8:
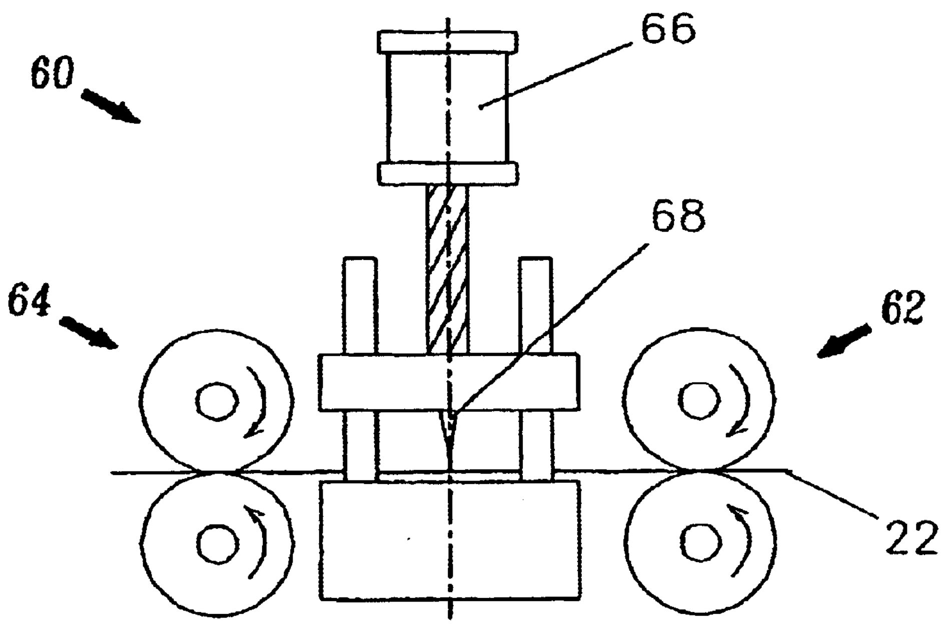
FIG. 8 a schematic view generally illustrating an exemplary operation of the punching device shown in FIG. 7.

FIG. 7 and FIG. 8 are diagrams that respectively illustrate a perspective view and an exemplary operation of the punching device 60 in accordance with an embodiment of the invention. The punching device 60 primarily comprises two pairs of cylindrical rollers (62 and 64), a cylinder 66 and a cutting device 68. The cylindrical rollers 62 serve to receive and flatten the V-shaped core material ribbon, and keep the core material ribbon tightly moving in conjunction with the cylinder rollers 64. The cutting device 68 is driven by the cylinder 66, controlled by the control device 100 (not shown in FIG. 7 and FIG. 8), to punch on and cut the core material ribbon off while the predetermined length of the core material ribbon is passing therethrough.

Figure 9:
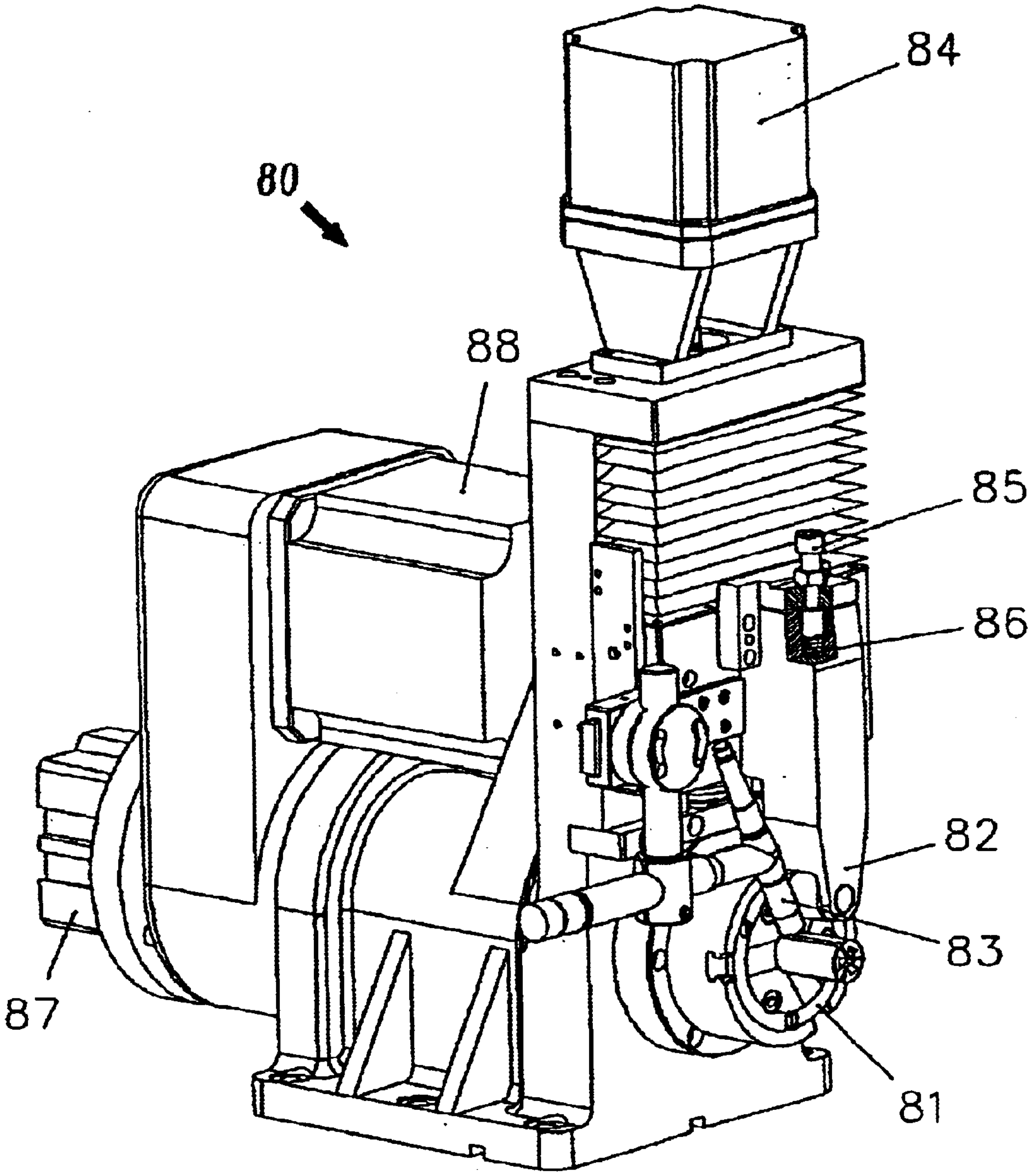
FIG. 9 is a schematic view illustrating an exemplary winding device in accordance with an embodiment of the invention.

FIG. 9 is a schematic view that exemplarily illustrates the winding device 80 in accordance with an embodiment of the invention. The winding device 80 comprises a clamping device 81, pressing device 82, welding device 83, first servomotor 84 for actuating the pressing device 82, set screw 85, spring 86, cylinder 87 and second servomotor 88 for rotating the clamping device 81.

The clamping device 81 serves to receive and clamp one end of the core material ribbon. After the end of the core material ribbon is secured in position, the clamping device 81 starts to rotate about its axis by the actuation of the servomotor 88 for winding the core material ribbon into a wound core. During winding, the pressing device 81 presses on the core material ribbon with an appropriate force to ensure that the core is wound sufficiently tight. The force exerted by the pressing device 82 on the core material ribbon is provided by the spring 86 and the magnitude of the force is adjustable through the set screw 85. Every time the clamping device 81 completes a full turn of rotation (i.e., 360 degrees), the diameter of the partially completed wound core correspondingly increases by the thickness of the core material. The pressing device 82 accordingly moves away from the wound core by a distance corresponding to the thickness of the core material ribbon under the action of the first servomotor 84. In this manner, it is ensured that the pressing device 82 presses on the core material ribbon with a pressing force of an appropriate and sufficient magnitude. After the winding is complete, the welding device 83 performs spot welding to secure the end of the core material ribbon on the wound core so that the wound core will not spread out.

Figure 10:
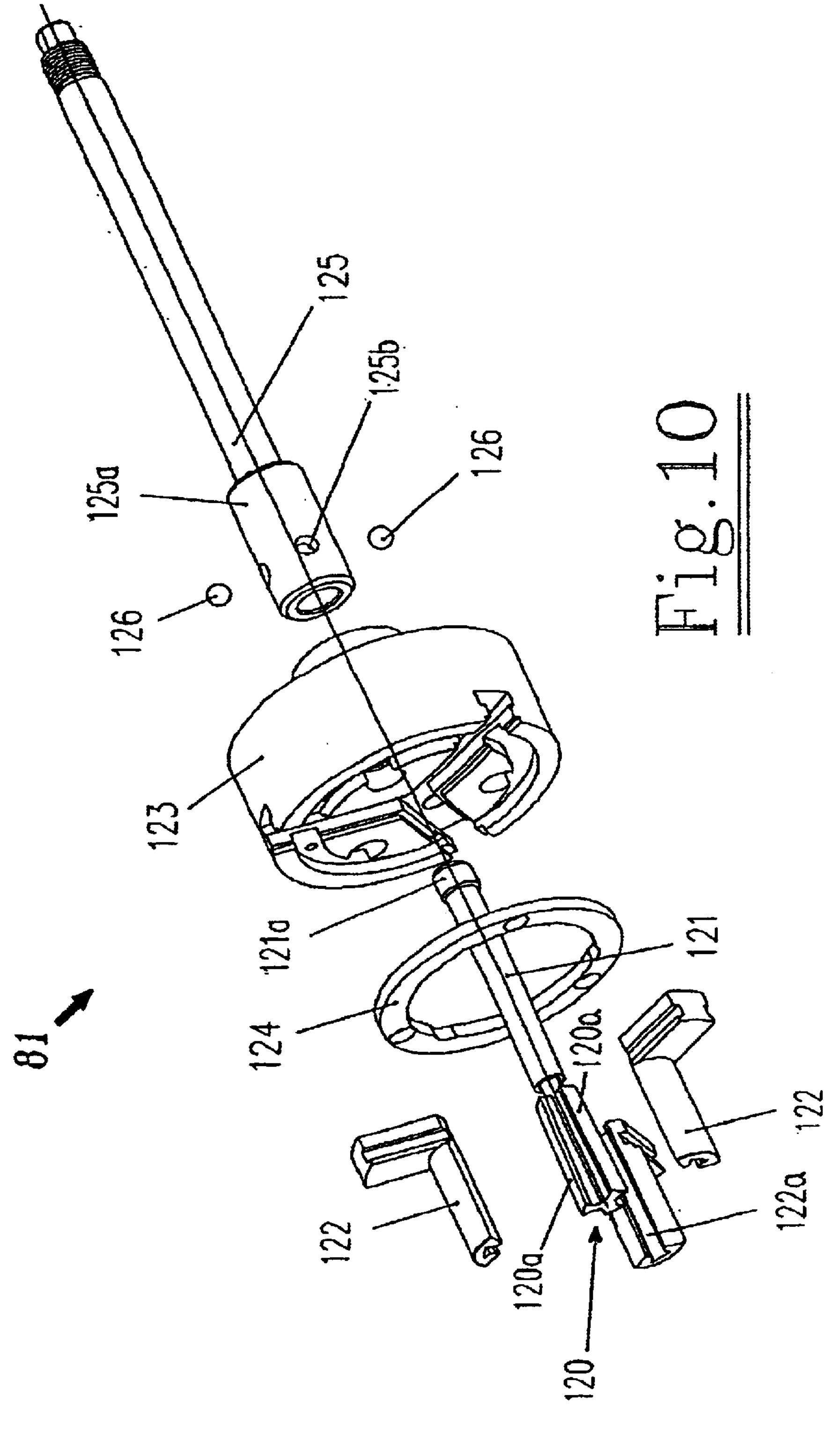
FIG. 10 is an exploded perspective view illustrating the structure of an exemplary clamping device in accordance with an embodiment of the invention.

FIG. 10 is a diagram that exemplarily illustrates an exploded perspective view of the clamping device 81 in accordance with an embodiment of the invention. The clamping device 81 accordingly comprises a guiding element 120 having three dovetail slideways 120*a* connected to a rod 121 having an enlarged end portion 121*a*, sliders 122 each having a complementary slot 122*a* for moving along the corresponding dovetail slideway 120*a*, a flange 123, a positioning circular ring 124 for securing the sliders 122 onto the flange 123, a rod 125 having a enlarged hollow head portion 125*a* for containing the enlarged end portion 121*a* of the rod 121, and balls 126 for being disposed within throughholes 125*b* provided on the head portion 125*a* and for restricting the moving of the enlarged end portion 121*a*.

Figures 10A, 10B:
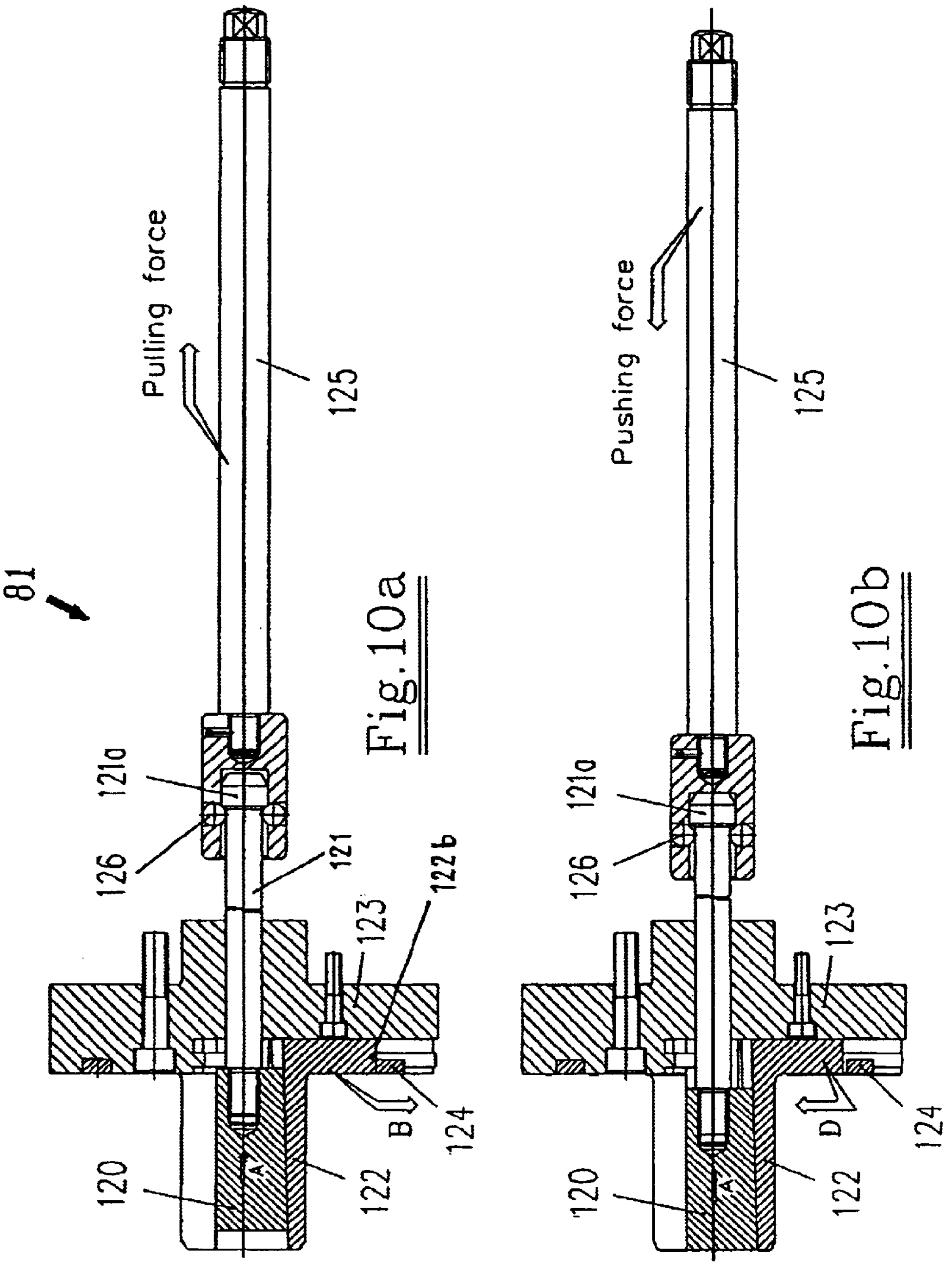
FIG. 10A and FIG. 10B are schematic views illustrating an exemplary operation of the clamping device shown in FIG. 10.

FIG. 10A and FIG. 10B are diagrams that respectively illustrate sectional views of the clamping device 81 and an exemplary operation thereof. With reference to FIG. 10A, while a pulling force is exerted on the distal end of the rod 125 by, e.g., a spring (not shown), the guiding element 120 moves in the axial direction indicated by arrow A through the interaction of the balls 126, the enlarged end portion 121*a* and the rod 121. While the guiding element 120 moves rightward, since the left portion of the guiding element 120 includes a larger dimension than the right portion, the sliders 122 having the slots 122*a* moving relative to the dovetail slideway 120*a* of the guiding element 120 are forced to move in a radially outward direction (as indicated by arrow B) until the radial outmost portions 122*b* of the sliders 122 are in contact with the positioning ring 124. The end of the core material ribbon is then inserted into the space between any two of the sliders 122 where the clamping device 81 starts to rotate for winding the core material ribbon into a wound core.

Figure 11:
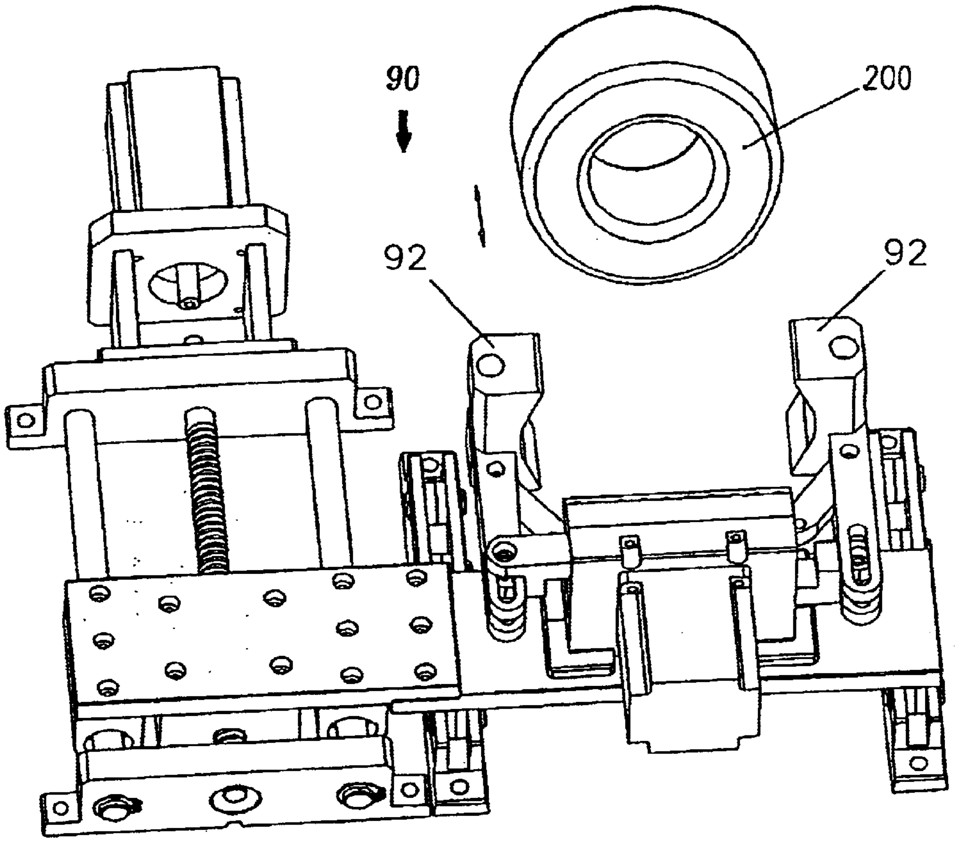
FIG. 11 is a schematic view illustrating an exemplary unloading device in accordance with an embodiment of the invention.

Referring to FIG. 10B, after the winding process is complete and the end of the core material ribbon is welded onto the wound core, a cylinder (not shown) punches on the distal end of the rod 125 to apply a pushing force over the force exerted by the spring so as to move the rod 125 leftward. Such a leftward movement of the rod 125 pushes the rod 121 and hence the guiding element 120 to move leftward, so that the sliders 122 move in a radially inward direction (as indicated by arrow D). Due to the radially inward movement of the sliders 122, the sliders 122 depart from the inner side of the wound core, where the wound core is readily dispensed away from the clamping device 122 through the robot arms 92 of the unloading device 90, as exemplarily illustrated in FIGS. 2 and 11 at the actuation of the control device 100.

Figure 12:
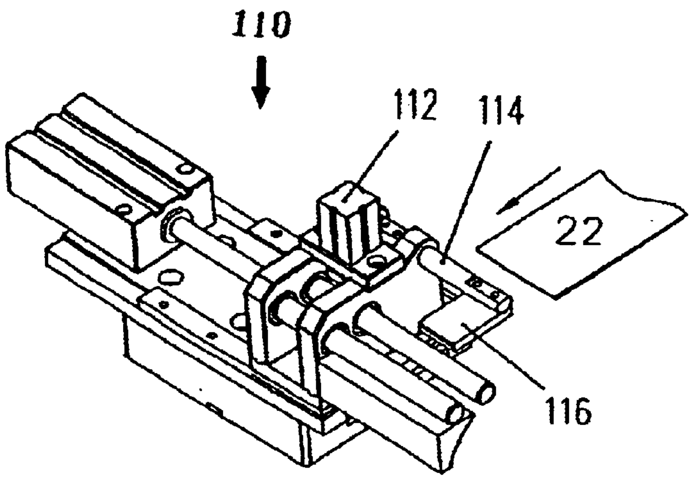
FIG. 12 is a schematic view illustrating an exemplary selecting device in accordance with an embodiment of the invention.
Figure 12A:
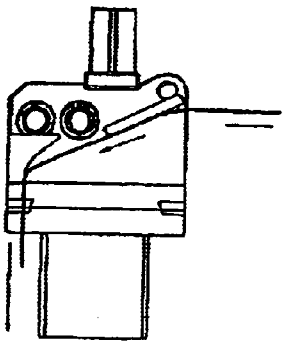
FIG. 12A and FIG. 12B are schematic views illustrating an exemplary operation of the selecting device shown in FIG. 12.
Figure 12B:
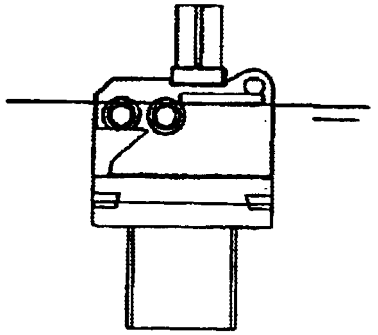

The apparatus 10 of the invention may further comprise a selecting device 110 for making certain that the each final wound core product includes generally the same dimension. FIG. 12 is a diagram that exemplarily illustrates the selecting device 110 in accordance with an embodiment of the invention. The selecting device 110 accordingly includes a cylinder 112, an actuating rod 114 and a guiding plate 116. If the length data provided by the counting device 40 indicate that the length of the core material ribbon passing through the counting device 40 matches the predetermined length for a wound core, the core material ribbon 12 will accordingly pass through the underside of the guiding plate 116 with the horizontally positioned guiding plate 166, as illustrated in FIG. 12A. However, if the length data provided by counting device 40 indicate that the length of the core material ribbon does not reach the predetermined length, the cylinder 112 will be actuated by the control device 100 and the actuating rod 114 is turned to force the guiding plate 16 directing the core material ribbon of insufficient length for disposal to a waste bin (not shown), as shown in FIG. 12B. In this manner, it is ensured that the toroidal core is wound from generally the same length of the core material ribbon and thus includes generally the same product dimensions.

In accordance with a further embodiment of the invention, a method is advantageously provided for manufacturing a magnetic wound core having an R-angle from a core material ribbon. The method according to this particular embodiment of the invention comprises the steps of cutting the core material ribbon into a predetermined length, forming the core material ribbon having lateral edges into a spread-out shape (such as a generally trapezoidal shape), grinding the lateral edges of the core material ribbon, and winding the core material ribbon into the core wound. The method according to this embodiment further comprises the step of coating insulating material onto the core material ribbon with silicon steel.

In addition, the method according to the invention can further comprise the steps of securing one end of the core material ribbon using a clamping device, rotating the clamping device to wind the core material ribbon into the wound core, pressing on the wound core with a predetermined force, and welding another end of the core material ribbon onto the wound core. A further step can also be included in applying a predetermined pressing force on the core material ribbon. If appropriate, the core material ribbon can be cut off and disposed of in a waste bin.

Yet another embodiment of the method according to the invention further provides the step of measuring a length of the core material ribbon passing through a counting device. In an additional embodiment, the core material ribbon comprises a generally flat shape in cross-section and generally V-shaped configuration in cross-section.

The method according to the invention can further comprise the step of controlling the apparatus according to parameters of the core material ribbon and the wound core. The parameters may include the thickness and length of the core material ribbon, and inner and outer diameters of the wound core.

Although the invention has been described with reference to the preferred embodiments, it will be understood that the invention is not limited to the details described thereof. Substitutions and modifications have been suggested in the foregoing description, and other will occur to those of ordinary skill in the art. In particular, the process steps of the method according to the invention will include methods having substantially the same process steps as the method of the invention to achieve substantially the same result. Therefore, all such substitutions and modifications are intended to be within the scope of the invention as defined in the appended claims and their equivalents.

I claim:

1. An apparatus for manufacturing a magnetic wound core from a core material ribbon, the apparatus comprising:

a control device for controlling the apparatus based on parameters of the core material ribbon and the wound core;

a supplying device for providing the core material ribbon having lateral edges;

a grinding device for grinding the lateral edges of the core material ribbon under control of the control device, comprising:

two grinding wheels, each of the grinding wheels disposed at one side of the core material ribbon for grinding the lateral edges thereof; and a servomotor for moving the grinding wheels horizontally toward or away from each other;

a winding device for receiving and winding the core material ribbon into the wound core.

2. The apparatus of claim 1 wherein the grinding device further comprises a device for receiving the core material ribbon of a generally flat shape in cross-section and providing the core material ribbon of a generally V-shaped configuration in cross-section.

3. The apparatus of claim 1 wherein the grinding device further comprises came for moving the grinding wheels in a vertically reciprocating manner.

4. A apparatus for manufacturing a magnetic wound core from a core material ribbon, the apparatus comprising:

a control device for controlling the apparatus based on parameters of the core material ribbon and the wound core;

a supplying device for providing the core material ribbon having lateral edges; a grinding device for grinding the lateral edges of the core material ribbon under control of the control device; and a winding device for receiving and winding the core material ribbon into the wound core comprising:

a clamping device for securing one end of the core material ribbon and rotating to wind the core material ribbon into the wound core;

a pressing device for pressing on the wound core with a predetermined force; and a welding device far welding another end of the core material ribbon onto the wound core.

5. The apparatus of claim 4, wherein the clamping device further comprises:

a guiding device having dovetail slideways; and sliders having complementary slots to the dovetail slideways.

6. The apparatus of claim 1, further comprising a calibration device for keeping the core material ribbon leaving from the supplying device horizontally and centered.

7. The apparatus of claim 6 wherein the calibration device further comprises at least one sandglass-shaped roller having two cone-shaped rollers with tips thereof coupled to each other.

8. The apparatus of claim 1 further comprising a counting device for measuring a length of the core material ribbon passing therethrough, wherein the counting device further comprises:

a pair of rollers disposed vertically one above the other for the core material ribbon passing therebetween; and a servomotor connected to the lower roller through a belt for counting number of revolutions of the lower roller;

wherein the upper roller is vertically adjustable for applying a predetermined pressing force on the core material ribbon.

9. The apparatus of claim 1 further comprising a selecting device for directing the core material ribbon for disposal under control of the control device.

10. The apparatus of claim 1 further comprising an unloading device for dislocating the wound core from the winding device.

11. An apparatus for manufacturing a magnetic wound core from a core material ribbon, comprising:

a control device for controlling the apparatus based on parameters of the core material ribbon and the wound core;

a supplying device for providing the core material ribbon having lateral edges; a calibration device for keeping the core material ribbon leaving from the supplying device horizontally and centered;

a counting device for measuring a length of the core material ribbon passing therethrough;

a grinding device for grinding the lateral edges of the core material ribbon under control of the control device;

a punch device for cutting off the core material ribbon under control of the control device;

a selecting device for directing the core material ribbon for disposal under control of the control device;

a winding device for receiving and winding the core material ribbon into the wound core; and an unloading device for taking the wound core out of the winding device.

12. The apparatus of claim 11 wherein the core material ribbon comprises silicon steel coated with insulating material thereon.

13. The apparatus of claim 11 wherein the containing device further comprises:

a pair of rollers disposed vertically one above the other for the core material ribbon passing therebetween; and a servomotor connected to the lower roller through a belt for counting number of revolutions of the lower roller, wherein the upper roller is vertically adjustable for applying a predetermined pressing force on the core material ribbon.

14. The apparatus of claim 11 wherein the calibration device further comprises at least one sandglass-shaped roller having two cone-shaped rollers with tips thereof coupled to each other.

15. The apparatus of claim 11 wherein the grinding device further comprises:

two grinding wheels, each of the grinding wheels disposed at one side of the core material ribbon for grinding the lateral edges thereof; and a servomotor for moving the grinding wheels horizontally toward or away from each other.

* * * * *

UNITED STATES PATENT AND TRADEMARK OFFICE

CERTIFICATE OF CORRECTION

PATENT NO. : 6,785,957 B2
DATED : September 7, 2004
INVENTOR(S) : Tsao

It is certified that error appears in the above-identified patent and that said Letters Patent is hereby corrected as shown below:

Title page,
Item [54], Title, delete "WITH R-ANGLE";

Column 8,
Line 35, delete "I claim", and insert in lieu thereof -- In the claims: --;
Line 59, delete "came", and insert in lieu thereof -- cams --;
Line 61, delete "A apparatus", and insert in lieu thereof -- An apparatus --;

Column 9,
Line 10, delete "far", and insert in lieu thereof -- for --;

Column 10,
Line 23, delete "containing" and insert in lieu thereof -- counting --;

Signed and Sealed this

Seventh Day of December, 2004

JON W. DUDAS
*Director of the United States Patent and Trademark Office*